United States Patent
Higashino et al.

(10) Patent No.: US 10,520,059 B2
(45) Date of Patent: Dec. 31, 2019

(54) VIBRATION ISOLATOR

(71) Applicant: Mitsubishi Electric Corporation, Tokyo (JP)

(72) Inventors: Makoto Higashino, Tokyo (JP); Shinya Nagata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/393,996

(22) Filed: Apr. 25, 2019

(65) Prior Publication Data

US 2019/0309820 A1 Oct. 10, 2019

Related U.S. Application Data

(63) Continuation of application No. PCT/JP2018/014781, filed on Apr. 6, 2018.

(51) Int. Cl.
| | | |
|---|---|---|
| *F16F 15/03* | (2006.01) | |
| *G05D 19/02* | (2006.01) | |
| *F16F 15/02* | (2006.01) | |
| *B30B 15/14* | (2006.01) | |

(52) U.S. Cl.
CPC ............. *F16F 15/03* (2013.01); *G05D 19/02* (2013.01); *B30B 15/14* (2013.01); *F16F 2228/04* (2013.01)

(58) Field of Classification Search
CPC ...... F16F 2228/04; F16F 15/03; G05D 19/02; B30B 15/14
USPC ................................................ 318/119, 689
See application file for complete search history.

(56) References Cited

U.S. PATENT DOCUMENTS 8,860,355 B2 * 10/2014 Ueda ....................... B30B 15/14
                                                                                 318/560
2010/0060220 A1    3/2010  Terada et al.

FOREIGN PATENT DOCUMENTS

| JP | 8-121530 A | 5/1996 |
|---|---|---|
| JP | 10-116104 A | 5/1998 |
| JP | 2002-221249 A | 8/2002 |
| JP | 2004-90211 A | 3/2004 |

(Continued)

OTHER PUBLICATIONS

International Search Report dated Jun. 12, 2018 for PCT/JP2018/014781 filed on Apr. 6, 2018, 3 pages only (Japanese Language Only).

(Continued)

*Primary Examiner* — Bickey Dhakal
*Assistant Examiner* — Zemenay T Truneh
(74) *Attorney, Agent, or Firm* — Xsensus LLP

(57) ABSTRACT

A vibration isolator includes: a vibration isolator moving part that suppresses vibration caused by operation of a drive unit moving part; a vibration isolating speed generation unit that generates a vibration isolating command speed on the basis of a target position of the drive unit moving part; a return speed generation unit that generates a return command speed for returning the vibration isolator moving part to an original position; a control speed generation unit that generates a control command speed by adding the vibration isolating command speed generated by the vibration isolating speed generation unit and the return command speed generated by the return speed generation unit; and a vibration isolation control unit that controls the vibration isolator moving part on the basis of the control command speed generated by the control speed generation unit.

12 Claims, 6 Drawing Sheets

(56) References Cited

FOREIGN PATENT DOCUMENTS

JP      2012-52666 A      3/2012
WO      2008/066035 A1    6/2008

OTHER PUBLICATIONS

Decision to Grant a Patent received for Japanese Patent Application No. 2018-540089, dated Sep. 18, 2018, 5 pages including English translation.

* cited by examiner

VIBRATION ISOLATOR

CROSS-REFERENCE TO RELATED APPLICATION

This application is a continuation of International Application No. PCT/JP2018/014781 filed on Apr. 6, 2018, the entire contents of which are incorporated herein by reference.

FIELD

The present invention relates to a vibration isolator that suppresses vibration caused by operation of a drive unit disposed on a rack, the vibration being generated in the rack, for example.

BACKGROUND

There has been known a semiconductor exposure apparatus in which a drive unit is disposed on a rack. The drive unit includes a drive unit moving part having a function of changing a position of a positioning control target. Examples of the drive unit moving part include an XY stage. In many cases, a vibration absorbing unit that absorbs vibration propagating from a floor to the rack is provided on the rack. In that case, vibration propagating from the floor to the rack is suppressed by the vibration absorbing unit. However, the vibration absorbing unit cannot appropriately attenuate the vibration caused by operation of the drive unit moving part, the vibration being generated in the rack. Patent Literature 1 discloses a vibration isolator that suppresses vibration caused by operation of a drive unit moving part, the vibration being generated in a rack.

CITATION LIST

Patent Literature

Patent Literature 1: Japanese Patent Application Laid-open No. 2012-52666

SUMMARY

Technical Problem

However, in the vibration isolator disclosed in Patent Literature 1, there is a possibility that the vibration isolator moving part included in the vibration isolator exceeds the stroke end of the vibration isolator moving part. When the vibration isolator moving part exceeds the stroke end, it becomes difficult to suppress vibration caused by the operation of the drive unit moving part, the vibration being generated in the rack. That is, when the vibration isolator moving part exceeds the stroke end, vibration occurs in a vibration isolation control target. Examples of the vibration isolation control target include a rack.

The present invention has been conceived in view of the above, and an object of the present invention is to provide a vibration isolator that prevents a vibration isolator moving part for suppressing vibration of a vibration isolation control target caused by operation of a drive unit moving part from exceeding a stroke end of the vibration isolator moving part.

Solution to Problem

In order to solve the above-described problem and to achieve the object, the present invention includes a vibration isolator moving part for suppressing vibration caused by operation of a drive unit moving part, a vibration isolating speed generation unit that generates a vibration isolating command speed on the basis of a target position of the drive unit moving part, and a return speed generation unit that generates a return command speed for returning the vibration isolator moving part to an original position. The present invention further includes a control speed generation unit that generates a control command speed by adding the vibration isolating command speed generated by the vibration isolating speed generation unit and the return command speed generated by the return speed generation unit, and a vibration isolation control unit that controls the vibration isolator moving part on the basis of the control command speed generated by the control speed generation unit.

Here, the drive unit moving part and the vibration isolator moving part will be described with reference to FIG. 1 with a table moving device using a ball screw serving as an example. When a ball screw drive motor 24 is driven, a ball screw mechanism 23 is subject to linear movement, and a table 21 attached thereto is subject to linear movement. The linear movement of the table 21 causes a rack 22 to vibrate, and vibration is transferred to the ground. Accordingly, a linear-movement motor 25 attached to the rack 22 is driven such that the vibration is suppressed, thereby suppressing the vibration of the rack 22. In such a system, the ball screw drive motor 24 is the drive unit moving part, the linear-movement motor 25 is the vibration isolator moving part, the table 21 is the positioning control target, and the rack 22 is the vibration isolation control target.

Advantageous Effects of Invention

The vibration isolator according to the present invention has an effect that the vibration isolator can prevent the vibration isolator moving part for suppressing vibration of the vibration isolation control target caused by operation of the drive unit moving part from exceeding a stroke end of the vibration isolator moving part.

DESCRIPTION OF EMBODIMENTS

Hereinafter, a vibration isolator according to an embodiment of the present invention will be described in detail with reference to the accompanying drawings. Note that the present invention is not limited by this embodiment.

Embodiment

Figure 1:
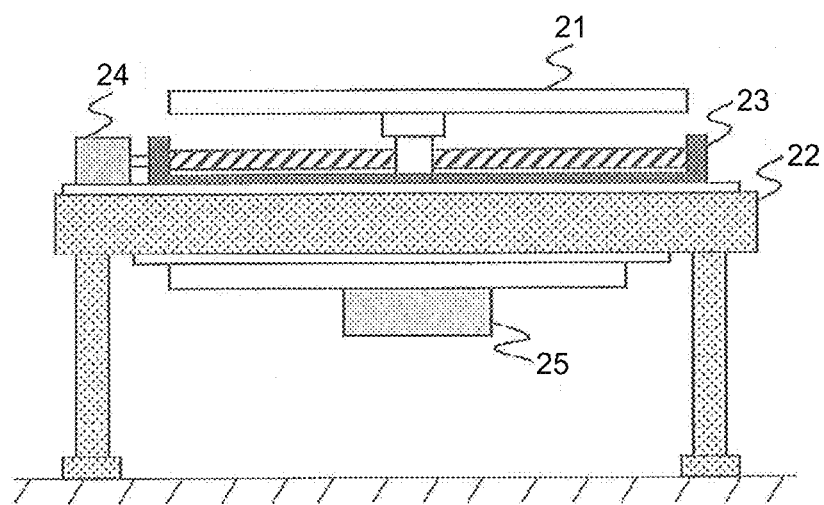
FIG. 1 is a diagram for illustrating a drive unit moving part and a vibration isolator moving part.
Figure 2:
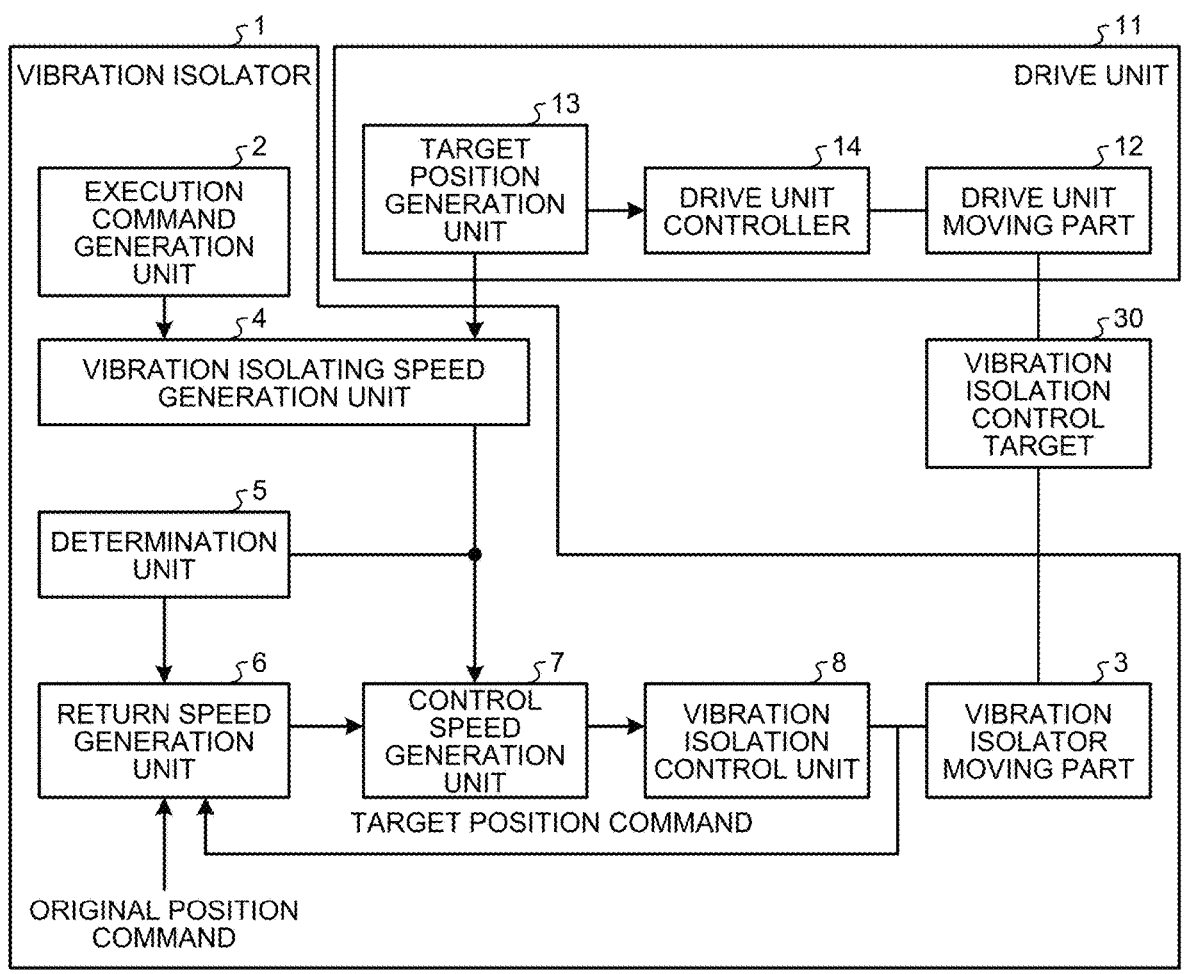
FIG. 2 is a diagram illustrating a configuration of a vibration isolator according to an embodiment.

FIG. 2 is a diagram illustrating a configuration of a vibration isolator 1 according to an embodiment. A vibration isolator 1 is a device that suppresses vibration caused by operation of a drive unit moving part 12, the vibration being generated in a vibration isolation control target 30. The drive unit moving part 12 is included in a drive unit 11. The drive unit 11 and the vibration isolation control target 30 are also illustrated in FIG. 2. The vibration isolator 1 and the drive unit 11 are disposed on a rack. Examples of the vibration isolation control target 30 include a rack.

The drive unit 11 includes the drive unit moving part 12 having a function of moving a positioning control target, a target position generation unit 13 that generates a target position of the drive unit moving part 12, and a drive unit controller 14 that controls the drive unit moving part 12 on the basis of the target position generated by the target position generation unit 13. The positioning control target is not illustrated in FIG. 2. Vibration is generated in the vibration isolation control target 30 when the drive unit moving part 12 moves the positioning control target. As described above, the vibration isolator 1 is a device that suppresses vibration caused by the operation of the drive unit moving part 12, the vibration being generated in the vibration isolation control target 30.

The vibration isolator 1 includes an execution command generation unit 2 that generates a vibration isolation execution command that is a command for executing vibration isolation, a vibration isolator moving part 3 for suppressing the vibration caused by the operation of the drive unit moving part 12, the vibration being generated in the vibration isolation control target 30, and a vibration isolating speed generation unit 4 that generates a vibration isolating command speed on the basis of the target position of the drive unit moving part 12 of the drive unit 11. The vibration isolator moving part 3 includes a motor, and moves by power of the motor. The vibration isolating command speed generated by the vibration isolating speed generation unit 4 is a command speed for suppressing the vibration caused by the operation of the drive unit moving part 12, the vibration being generated in the vibration isolation control target 30.

For example, the vibration isolating speed generation unit 4 multiplies a difference between a previous target position output from the target position generation unit 13 of the drive unit 11 and a current target position output from the target position generation unit 13 by a predetermined coefficient, and adds a correction value to the value obtained by the multiplication, thereby generating the vibration isolating command speed. For example, the coefficient mentioned above is a ratio between mass of the drive unit moving part 12 and mass of the vibration isolator moving part 3. For example, the correction value mentioned above is a value determined by extraneous disturbance factors caused by an amount of friction of the drive unit moving part 12.

Operation of the vibration isolator moving part 3 may not be required in some cases. Accordingly, the vibration isolating speed generation unit 4 generates the vibration isolating command speed when the execution command generation unit 2 outputs the vibration isolation execution command. In other words, when the execution command generation unit 2 does not output the vibration isolation execution command, the vibration isolating speed generation unit 4 sets the value of the vibration isolating command speed to "0". The vibration isolator 1 further includes a determination unit 5 that determines whether the vibration isolating speed generation unit 4 has output the vibration isolating command speed other than zero.

The vibration isolator 1 further includes a return speed generation unit 6 that generates a return command speed for returning the vibration isolator moving part 3 to an original position. The original position is a position set in advance to prevent the vibration isolator moving part 3 from exceeding a preset stroke end. The original position is set using, for example, means for setting a parameter. The return speed generation unit 6 generates the return command speed when the determination unit 5 determines that the vibration isolating speed generation unit 4 has output the vibration isolating command speed other than zero.

The vibration isolator 1 further includes a control speed generation unit 7 that generates a control command speed by adding the vibration isolating command speed generated by the vibration isolating speed generation unit 4 and the return command speed generated by the return speed generation unit 6. As described above, the vibration isolating speed generation unit 4 generates the vibration isolating command speed when the execution command generation unit 2 outputs the vibration isolation execution command. The return speed generation unit 6 generates the return command speed on the basis of the determination unit 5 that determines whether the vibration isolating speed generation unit 4 has output the vibration isolating command speed other than zero.

The vibration isolator 1 further includes a vibration isolation control unit 8 that controls the vibration isolator moving part 3 on the basis of the control command speed generated by the control speed generation unit 7. For example, the vibration isolation control unit 8 generates, on the basis of the control command speed, a target position command indicating a target position of the vibration isolator moving part 3, and controls the vibration isolator moving part 3 on the basis of the target position command. An original position command indicating the original position, and the target position command are input to the return speed generation unit 6, and the return speed generation unit 6 generates the return command speed on the basis of a difference between the original position and the target position.

Figure 3:
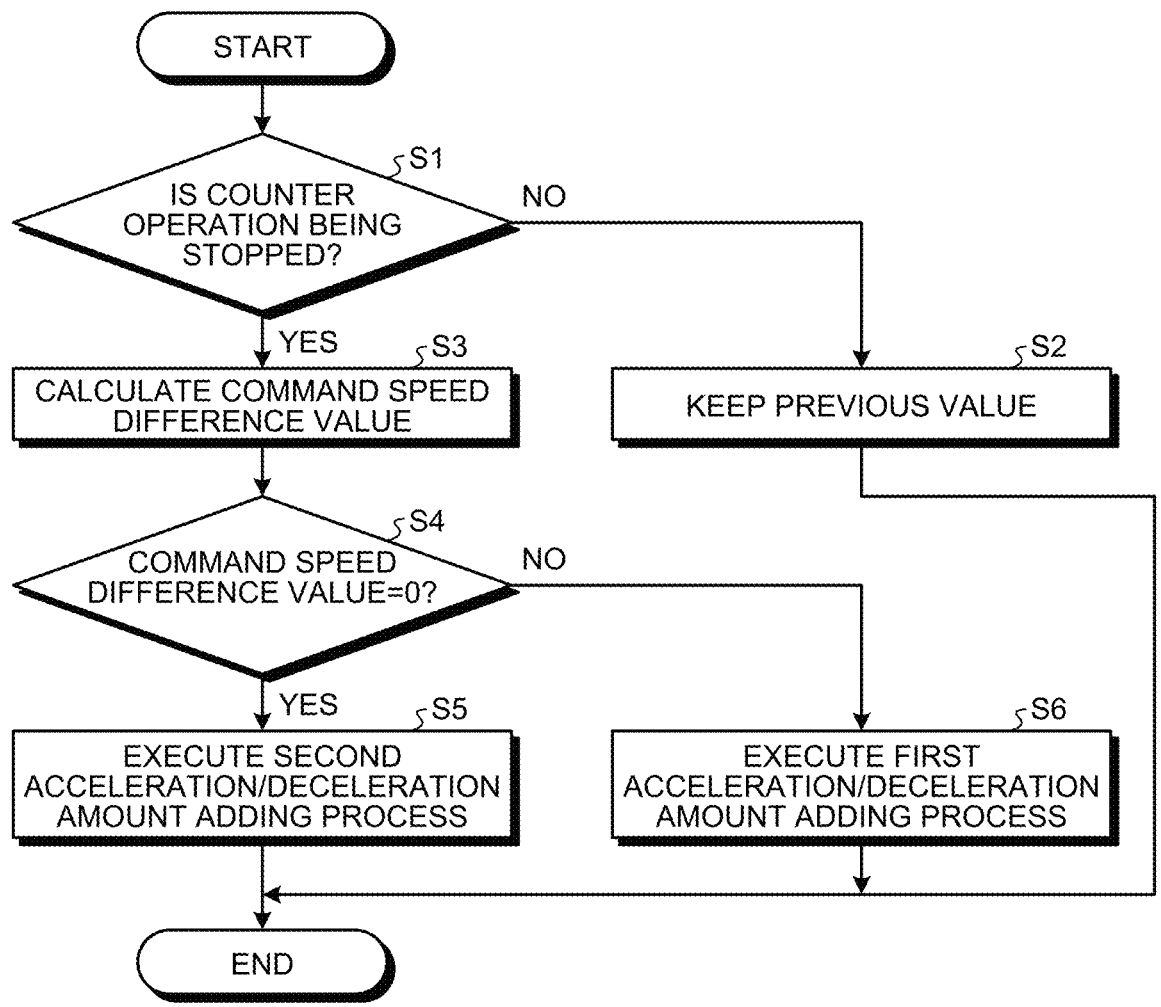
FIG. 3 is a flowchart illustrating procedures of operation of a return speed generation unit included in the vibration isolator according to the embodiment.

FIG. 3 is a flowchart illustrating procedures of operation of the return speed generation unit 6 included in the vibration isolator 1 according to the embodiment. The return speed generation unit 6 determines, on the basis of the determination made by the determination unit 5, whether counter operation is being stopped (S1). The counter operation is operation in which the vibration isolating speed generation unit 4 generates the vibration isolating command speed. When it is determined that the counter operation is not being stopped (No in S1), the return speed generation unit 6 keeps the return command speed generated last time (S2), and the operation is terminated. In step S2 in FIG. 3, the "return command speed generated last time" is described as a "previous value".

When it is determined that the counter operation is being stopped (Yes in S1), the return speed generation unit 6 calculates a command speed difference value by using the following formula (1) (S3). That is, in step S3, the return speed generation unit 6 calculates a difference value between a current return command speed and a reference command speed.

$$\text{Command speed difference value} = \text{Current return command speed} - \text{Reference command speed} \quad (1)$$

The reference command speed is a speed in the case where the vibration isolator moving part 3 returns from the current position to the original position at constant acceleration/deceleration. The reference command speed is calculated by the return speed generation unit 6. The acceleration/deceleration is speed. An amount of the acceleration/deceleration is determined on the basis of a value of second origin return thrust that can be optionally set, characteristics of the motor of the vibration isolator moving part 3, and mass of a load mounted on the vibration isolator moving part 3. The acceleration/deceleration amount is defined as a second acceleration/deceleration amount. That is, the acceleration/deceleration amount in the case where the vibration isolator moving part 3 returns to the original position is the second acceleration/deceleration amount, and the thrust at that time is limited by the second origin return thrust.

Next, the return speed generation unit 6 determines whether the command speed difference value is "0" (S4). When the command speed difference value is "0" (Yes in S4), the return speed generation unit 6 executes a second acceleration/deceleration amount adding process (S5). When the command speed difference value is other than "0" (No in S4), the return speed generation unit 6 executes a first acceleration/deceleration amount adding process (S6). The first acceleration/deceleration amount adding process and the second acceleration/deceleration amount adding process will be described below.

Figure 4:
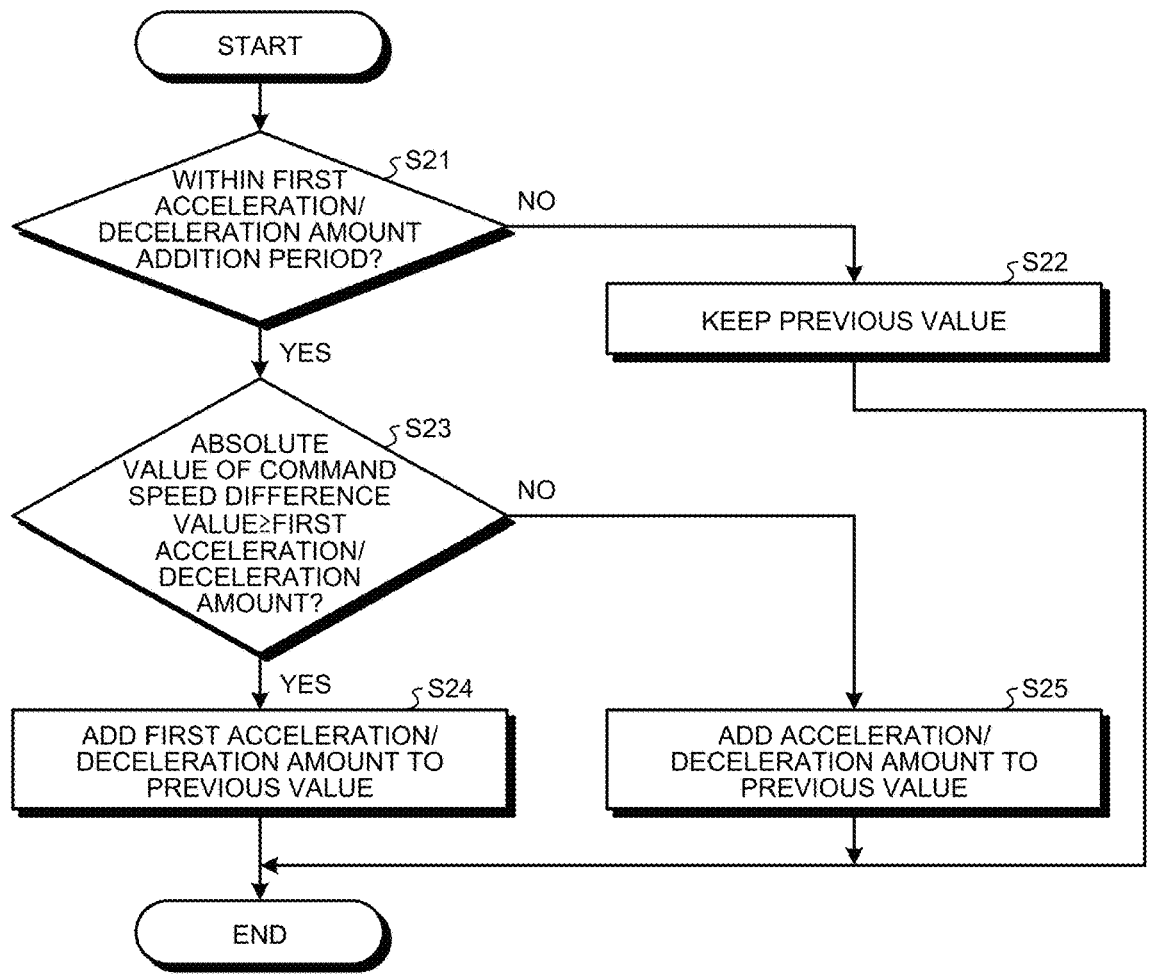
FIG. 4 is a flowchart illustrating procedures of a first acceleration/deceleration amount adding process executed by the return speed generation unit included in the vibration isolator according to the embodiment.

FIG. 4 is a flowchart illustrating procedures of the first acceleration/deceleration amount adding process executed by the return speed generation unit 6 included in the vibration isolator 1 according to the embodiment. The return speed generation unit 6 determines whether the current time is included in a first acceleration/deceleration amount addition period (S21). The first acceleration/deceleration amount addition period is a predetermined fixed period starting from the time at which the determination unit 5 determines that the vibration isolating speed generation unit 4 has output the vibration isolating command speed having a value of zero, which can be optionally set.

When it is determined that the current time is not included in the first acceleration/deceleration amount addition period (No in S21), the return speed generation unit 6 keeps the return command speed generated last time (S22), and the operation is terminated. In FIG. 4, the "return command speed generated last time" is described as a "previous value". When it is determined that the current time is included in the first acceleration/deceleration amount addition period (Yes in S21), the return speed generation unit 6 determines whether the absolute value of the command speed difference value described above is equal to or more than the absolute value of the first acceleration/deceleration amount (S23). The first acceleration/deceleration amount may be a positive value, or may be a negative value. The "first acceleration/deceleration amount" described in step S23 in FIG. 4 indicates the absolute value of the first acceleration/deceleration amount.

When it is determined that the absolute value of the command speed difference value is equal to or more than the absolute value of the first acceleration/deceleration amount (Yes in S23), the return speed generation unit 6 adds the first acceleration/deceleration amount to the return command speed generated last time to generate a new return command speed so that the control command speed approaches the reference command speed (S24). The first acceleration/deceleration amount is determined on the basis of a value of first origin return thrust that can be optionally set, the characteristics of the motor of the vibration isolator moving part 3, and the mass of the load mounted on the vibration isolator moving part 3. The acceleration/deceleration amount in the case where the vibration isolator moving part 3 returns to the original position is the second acceleration/deceleration amount, and the thrust at that time is limited by the second origin return thrust. The first origin return thrust is different from the second origin return thrust.

When it is determined that the absolute value of the command speed difference value is smaller than the absolute value of the first acceleration/deceleration amount (No in S23), the return speed generation unit 6 adds the acceleration/deceleration amount to the return command speed generated last time to generate a new return command speed so that the control command speed becomes the same as the reference command speed (S25). The acceleration/deceleration amount may be a positive value, or may be a negative value. The absolute value of the acceleration/deceleration amount is smaller than the absolute value of the first acceleration/deceleration amount.

In this manner, in the predetermined first acceleration/deceleration amount addition period, the return speed generation unit 6 adds either the first acceleration/deceleration amount or the acceleration/deceleration amount smaller than the absolute value of the first acceleration/deceleration amount to the return command speed generated last time to generate a new return command speed.

Figure 5:
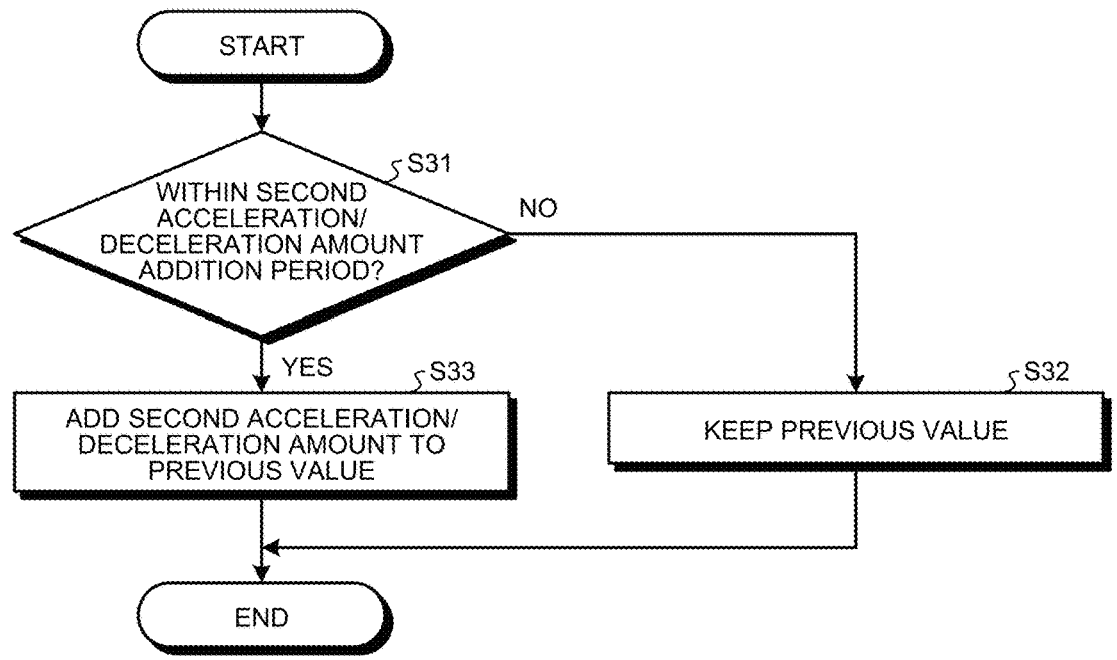
FIG. 5 is a flowchart illustrating procedures of a second acceleration/deceleration amount adding process executed by the return speed generation unit included in the vibration isolator according to the embodiment.

FIG. 5 is a flowchart illustrating procedures of the second acceleration/deceleration amount adding process executed by the return speed generation unit 6 included in the vibration isolator 1 according to the embodiment. The return speed generation unit 6 determines whether the current time is included in a second acceleration/deceleration amount addition period (S31). The second acceleration/deceleration amount addition period is a period starting from the time at which the determination unit 5 determines that the vibration isolating speed generation unit 4 has output the vibration isolating command speed having a value of zero. A termination time of the second acceleration/deceleration amount addition period is the time at which the determination unit 5 determines that the vibration isolating speed generation unit 4 has output the vibration isolating command speed other than zero.

When it is determined that the current time is not included in the second acceleration/deceleration amount addition period (No in S31), the return speed generation unit 6 keeps the return command speed generated last time (S32), and the operation is terminated. In FIG. 5, the "return command speed generated last time" is described as a "previous value". When it is determined that the current time is included in the second acceleration/deceleration amount addition period (Yes in S31), the return speed generation unit 6 adds the second acceleration/deceleration amount to the return command speed generated last time (S33).

In this manner, when the current return command speed matches the reference command speed, the return speed generation unit 6 adds, in the second acceleration/deceleration amount addition period in which the starting time is set in advance, the second acceleration/deceleration amount to the return command speed generated last time, thereby generating a new return command speed.

As described above, the return speed generation unit 6 calculates, on the basis of the thrust that can be optionally set in the case where the vibration isolator moving part 3 returns to the origin, the characteristics of the motor of the vibration isolator moving part 3, and the mass of the load mounted on the vibration isolator moving part 3, the acceleration/deceleration amount corresponding to the thrust in the case where the vibration isolator moving part 3 returns to the origin, and adds the acceleration/deceleration amount to the return command speed generated last time, thereby generating a new return command speed.

Specifically, the return speed generation unit 6 calculates, on the basis of the first origin return thrust that can be optionally set in the case where the vibration isolator moving part 3 returns to the origin, the characteristics of the motor of the vibration isolator moving part 3, and the mass of the load mounted on the vibration isolator moving part 3, the first acceleration/deceleration amount corresponding to the first origin return thrust, and adds the first acceleration/deceleration amount to the return command speed generated last time, thereby generating a new return command speed.

The return speed generation unit 6 calculates, on the basis of the second origin return thrust that can be optionally set in the case where the vibration isolator moving part 3 returns to the origin, the characteristics of the motor of the vibration isolator moving part 3, and the mass of the load mounted on the vibration isolator moving part 3, the second acceleration/deceleration amount corresponding to the second origin return thrust, and adds the second acceleration/deceleration amount to the return command speed generated last time, thereby generating a new return command speed.

Hereinafter, the first acceleration/deceleration amount is assumed to be larger than the second acceleration/deceleration amount. In addition, in the first acceleration/deceleration amount addition period with respect to the first acceleration/deceleration amount adding process, it is assumed that the first acceleration/deceleration amount is not added at the timing same as the timing at which the counter operation is performed. Furthermore, in the second acceleration/deceleration amount addition period with respect to the second acceleration/deceleration amount adding process, it is assumed that the second acceleration/deceleration amount may be added at the timing same as the timing at which the counter operation is performed.

In general, the dwell during each operation at the time when the drive unit continuously performs a plurality of operations is not a fixed value in many cases. That is, in general, although the dwell for a certain period of time is secured, it changes during the period from when the drive unit terminates one operation until when the drive unit starts the next operation. Therefore, when the amount of the dwell is determined, the return speed generation unit 6 adds the first acceleration/deceleration amount to the return command speed generated last time so that the vibration isolator moving part 3 can return to the original position earlier. When the amount of the dwell is not determined, the return speed generation unit 6 adds the second acceleration/deceleration amount to the return command speed generated last time so that the vibration isolator moving part 3 can return to the original position even when the counter operation is performed at any point of time.

Note that, as the second acceleration/deceleration amount, a value in which fluctuation of the thrust to the vibration isolator moving part 3 caused by the thrust based on the counter operation being added to the vibration isolator moving part 3 falls within the range of vibration of the vibration isolation control target 30 permitted in advance is set.

Figure 6:
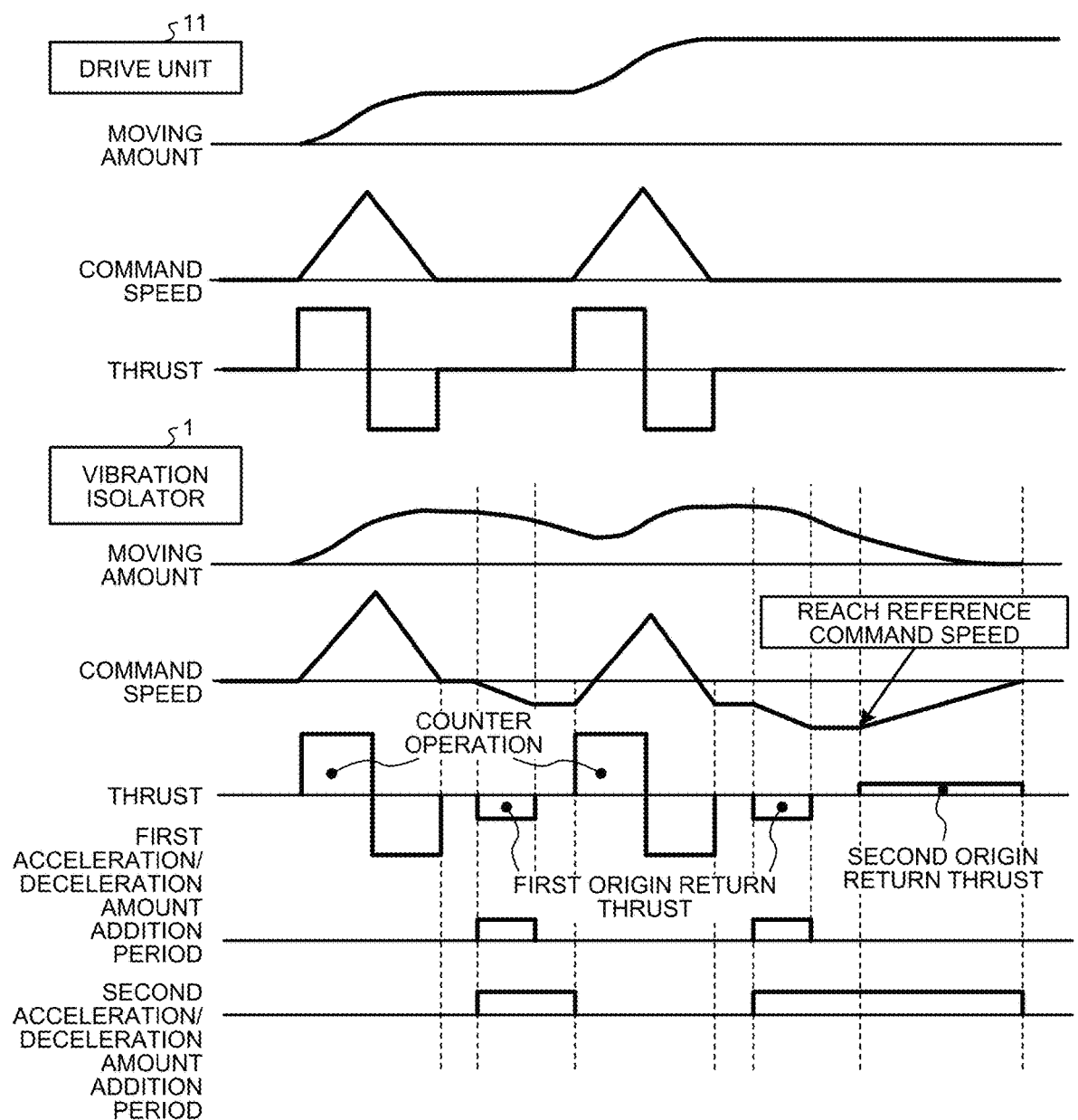
FIG. 6 is a timing chart of one example of each data associated with the vibration isolator and a drive unit in the case where the vibration isolator according to the embodiment is used.

FIG. 6 is a timing chart of one example of each data associated with the vibration isolator 1 and the drive unit 11 in the case where the vibration isolator 1 according to the embodiment is used. In FIG. 6, the "moving amount" described immediately under the character string "drive unit 11" indicates a moving amount of the drive unit moving part 12 included in the drive unit 11. The "command speed" described under the character string "drive unit 11" and above the character string "vibration isolator 1" indicates a command speed input to the drive unit controller 14 included in the drive unit 11. The "thrust" described under the character string "drive unit 11" and above the character string "vibration isolator 1" indicates the thrust in the drive unit moving part 12.

The "moving amount" described under the character string "vibration isolator 1" indicates a moving amount of the vibration isolator moving part 3 included in the vibration isolator 1. The "command speed" described under the character string "vibration isolator 1" indicates the control command speed input to the vibration isolation control unit 8. The "thrust" described under the character string "vibration isolator 1" indicates the thrust generated in the vibration isolator moving part 3. The first acceleration/deceleration amount addition period and the second acceleration/deceleration amount addition period are also illustrated in FIG. 6.

As can be understood by focusing on, out of the two first acceleration/deceleration amount addition periods in FIG. 6, the latter first acceleration/deceleration amount addition period, the first acceleration/deceleration amount is added to the return command speed generated last time in the latter first acceleration/deceleration amount addition period, whereby the control command speed reaches the reference command speed. In the subsequent second acceleration/deceleration amount addition period, the first acceleration/deceleration amount is added to the return command speed generated last time, whereby the vibration isolator moving part 3 returns to the original position.

As described above, the vibration isolator 1 according to the embodiment adds the vibration isolating command speed and the return command speed to generate the control command speed, and controls the vibration isolator moving part 3 on the basis of the control command speed. Therefore, the vibration isolator 1 can prevent the vibration isolator moving part 3 for suppressing vibration of the vibration isolation control target 30 caused by operation of the drive unit moving part 12 from exceeding a stroke end of the vibration isolator moving part 3.

Note that, although the first acceleration/deceleration amount and the second acceleration/deceleration amount are used in the embodiment described above, only one of the first acceleration/deceleration amount and the second acceleration/deceleration amount may be used. Each of the first acceleration/deceleration amount and the second acceleration/deceleration amount is not limited to the example described above. Three or more acceleration/deceleration amounts may be used.

Figure 7:
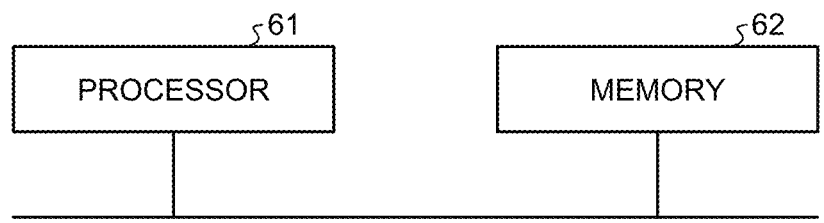
FIG. 7 is a diagram illustrating a processor in the case where at least a part of functions of an execution command generation unit, a vibration isolating speed generation unit, a determination unit, a return speed generation unit, a control speed generation unit, and a vibration isolation control unit included in the vibration isolator according to the embodiment is implemented by the processor.

FIG. 7 is a diagram illustrating a processor 61 in the case where at least a part of functions of the execution command generation unit 2, the vibration isolating speed generation unit 4, the determination unit 5, the return speed generation unit 6, the control speed generation unit 7, and the vibration isolation control unit 8 included in the vibration isolator 1 according to the embodiment is implemented by the processor 61. That is, at least a part of the functions of the execution command generation unit 2, the vibration isolating speed generation unit 4, the determination unit 5, the return speed generation unit 6, the control speed generation unit 7, and the vibration isolation control unit 8 may be implemented by the processor 61 that executes a program stored in a memory 62.

The processor 61 is a central processing unit (CPU), a processing device, an arithmetic device, a microprocessor, a microcomputer, or a digital signal processor (DSP). The memory 62 is also illustrated in FIG. 7.

When at least a part of the functions of the execution command generation unit 2, the vibration isolating speed generation unit 4, the determination unit 5, the return speed generation unit 6, the control speed generation unit 7, and the vibration isolation control unit 8 is implemented by the processor 61, the part of the functions is implemented by a combination of the processor 61 and software or firmware, or a combination of the processor 61, software, and firmware. The software or the firmware is written as a program, which is stored in the memory 62.

The processor 61 reads out and executes the program stored in the memory 62, thereby implementing at least a part of the functions of the execution command generation unit 2, the vibration isolating speed generation unit 4, the determination unit 5, the return speed generation unit 6, the control speed generation unit 7, and the vibration isolation control unit 8.

That is, when the processor 61 implements at least a part of the functions of the execution command generation unit 2, the vibration isolating speed generation unit 4, the determination unit 5, the return speed generation unit 6, the control speed generation unit 7, and the vibration isolation control unit 8, the vibration isolator 1 includes the memory 62 for storing the program by which a step executed by at least a part of the execution command generation unit 2, the vibration isolating speed generation unit 4, the determination unit 5, the return speed generation unit 6, the control speed generation unit 7, and the vibration isolation control unit 8 is eventually executed.

It can also be said that the program stored in the memory 62 causes a computer to execute a procedure or a method executed by at least a part of the execution command generation unit 2, the vibration isolating speed generation unit 4, the determination unit 5, the return speed generation unit 6, the control speed generation unit 7, and the vibration isolation control unit 8.

Examples of the memory 62 include a non-volatile or a volatile semiconductor memory such as a random access memory (RAM), a read only memory (ROM), a flash memory, an erasable programmable read only memory (EPROM), an electrically erasable programmable read only memory (EEPROM) (registered trademark); a magnetic disk; a flexible disk; an optical disk; a compact disk; a mini-disk; a digital versatile disk (DVD), or the like.

Figure 8:
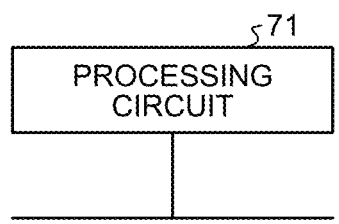
FIG. 8 is a diagram illustrating a processing circuit in the case where at least a part of constituent elements of the execution command generation unit, the vibration isolating speed generation unit, the determination unit, the return speed generation unit, the control speed generation unit, and the vibration isolation control unit included in the vibration isolator according to the embodiment is implemented by the processing circuit.

FIG. 8 is a diagram illustrating a processing circuit 71 in the case where at least a part of constituent elements of the execution command generation unit 2, the vibration isolating speed generation unit 4, the determination unit 5, the return speed generation unit 6, the control speed generation unit 7, and the vibration isolation control unit 8 included in the vibration isolator 1 according to the embodiment is implemented by the processing circuit 71. That is, at least a part of the functions of the execution command generation unit 2, the vibration isolating speed generation unit 4, the determination unit 5, the return speed generation unit 6, the control speed generation unit 7, and the vibration isolation control unit 8 may be implemented by the processing circuit 71.

The processing circuit 71 is dedicated hardware. The processing circuit 71 is, for example, a single circuit, a combined circuit, a programmed processor, a parallel programed processor, an application specific integrated circuit (ASIC), a field-programmable gate array (FPGA), or a combination thereof. A part of the execution command generation unit 2, vibration isolating speed generation unit 4, the determination unit 5, the return speed generation unit 6, the control speed generation unit 7, and the vibration isolation control unit 8 may be dedicated hardware separate from the remainder.

A part of a plurality of functions of the execution command generation unit 2, the vibration isolating speed generation unit 4, the determination unit 5, the return speed generation unit 6, the control speed generation unit 7, and the vibration isolation control unit 8 may be implemented by software or firmware, and the remainder of the plurality of functions may be implemented by dedicated hardware. In this manner, the plurality of functions of the execution command generation unit 2, the vibration isolating speed generation unit 4, the determination unit 5, the return speed generation unit 6, the control speed generation unit 7, and the vibration isolation control unit 8 can be implemented by hardware, software, firmware, or a combination thereof.

The configuration described in the above-described embodiment indicates an example of the contents of the present invention. The configuration can be combined with another publicly known technique, and a part of the configuration can be omitted or changed without departing from the gist of the present invention.

REFERENCE SIGNS LIST 1 vibration isolator; 2 execution command generation unit; 3 vibration isolator moving part; 4 vibration isolating speed generation unit; 5 determination unit; 6 return speed generation unit; 7 control speed generation unit; 8 vibration isolation control unit; 11 drive unit; 12 drive unit moving part; 13 target position generation unit; 14 drive unit controller; 30 vibration isolation control target; 61 processor; 62 memory; 71 processing circuit.

The invention claimed is:
1. A device comprising:
a vibration isolator to suppress vibration caused by operation of a driver;
vibration isolating speed generator circuitry to generate a vibration isolating command speed on the basis of a target position of the driver;
return speed generator circuitry to generate a return command speed for returning the vibration isolator to an original position;
control speed generator circuitry to generate a control command speed by adding the vibration isolating command speed generated by the vibration isolating speed generator circuitry and the return command speed generated by the return speed generator circuitry; and vibration isolation control circuitry to control the vibration isolator on the basis of the control command speed generated by the control speed generator circuitry.

2. The device according to claim 1, wherein
the vibration isolator includes a motor, and
the return speed generator circuitry calculates, on the basis of thrust that can be optionally set in a case where the vibration isolator returns to origin, a characteristic of the motor of the vibration isolator, and mass of a load mounted on the vibration isolator, an acceleration/deceleration amount corresponding to the thrust in the case where the vibration isolator returns to the origin, and adds the acceleration/deceleration amount to a return command speed generated last time to generate a new return command speed.

3. The device according to claim 2, further comprising:
an execution command generator circuitry to generate a vibration isolation execution command that is a command for executing vibration isolation, wherein
the vibration isolating command speed is generated in a case where the execution command generator circuitry outputs the vibration isolation execution command.

4. The device according to claim 1, wherein
the vibration isolator includes a motor,
the return speed generator circuitry:
  calculates, on the basis of first origin return thrust that can be optionally set in a case where the vibration isolator returns to origin, a characteristic of the motor of the vibration isolator, and mass of a load mounted on the vibration isolator, a first acceleration/deceleration amount corresponding to the first origin return thrust, and adds the first acceleration/deceleration amount to a return command speed generated last time to generate a new return command speed; and
  calculates, on the basis of second origin return thrust that can be optionally set in the case where the vibration isolator returns to the origin, the characteristic of the motor of the vibration isolator, and the mass of the load mounted on the vibration isolator, a second acceleration/deceleration amount corresponding to the second origin return thrust, and adds the second acceleration/deceleration amount to the return command speed generated last time to generate a new return command speed, and
the first origin return thrust is different from the second origin return thrust.

5. The device according to claim 4, wherein
in a preset first acceleration/deceleration amount addition period, the return speed generator circuitry:
  calculates a difference value between a current return command speed and a reference command speed;
  in a case where an absolute value of the difference value is equal to or more than an absolute value of the first acceleration/deceleration amount, adds the first acceleration/deceleration amount to the return command speed generated last time to generate a new return command speed so that the control command speed approaches the reference command speed; and
  in a case where the absolute value of the difference value is smaller than the absolute value of the first acceleration/deceleration amount, adds an acceleration/deceleration amount to the return command speed generated last time to generate a new return command speed so that the control command speed becomes the same as the reference command speed, and
an absolute value of the acceleration/deceleration amount is smaller than the absolute value of the first acceleration/deceleration amount.

6. The device according to claim 5, further comprising:
execution command generator circuitry to generate a vibration isolation execution command that is a command for executing vibration isolation, wherein
the vibration isolating command speed is generated in a case where the execution command generator circuitry outputs the vibration isolation execution command.

7. The device according to claim 4, wherein
the return speed generator circuitry calculates a reference command speed that is a speed in a case where the vibration isolator returns from a current position to the original position at constant acceleration/deceleration.

8. The device according to claim 7, wherein
in a case where a current return command speed matches the reference command speed, the return speed generator circuitry adds the second acceleration/deceleration amount to the return command speed generated last time to generate the new return command speed in a second acceleration/deceleration amount addition period in which a starting time is set in advance.

9. The device according to claim 8, further comprising:
an execution command generator circuitry to generate a vibration isolation execution command that is a command for executing vibration isolation, wherein
the vibration isolating command speed is generated in a case where the execution command generator circuitry outputs the vibration isolation execution command.

10. The device according to claim 7, further comprising:
an execution command generator circuitry to generate a vibration isolation execution command that is a command for executing vibration isolation, wherein
the vibration isolating command speed is generated in a case where the execution command generator circuitry outputs the vibration isolation execution command.

11. The device according to claim 4, further comprising:
an execution command generator circuitry to generate a vibration isolation execution command that is a command for executing vibration isolation, wherein
the vibration isolating command speed is generated in a case where the execution command generator circuitry outputs the vibration isolation execution command.

12. The device according to claim 1, further comprising:
an execution command generator circuitry to generate a vibration isolation execution command that is a command for executing vibration isolation, wherein
the vibration isolating command speed is generated in a case where the execution command generator circuitry outputs the vibration isolation execution command.

* * * * *